April 30, 1935. H. L. SHUTTLEWORTH. Re. 19,554
FABRIC AND METHOD AND APPARATUS FOR PRODUCING IT
Original Filed Feb. 10, 1932 3 Sheets-Sheet 1
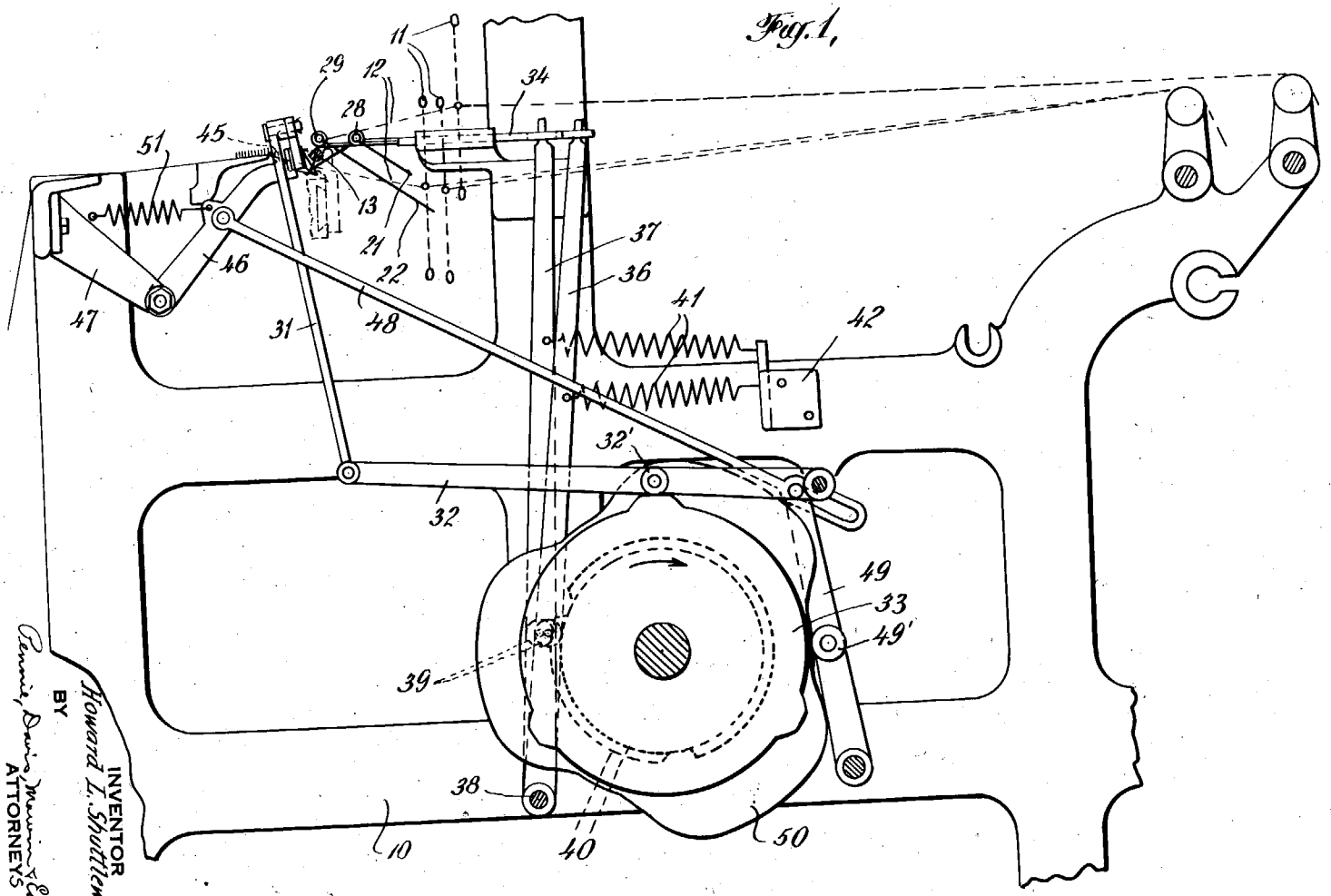
INVENTOR
Howard L. Shuttleworth
BY
Pennie, Davis, Marvin & Edmonds
ATTORNEYS April 30, 1935. H. L. SHUTTLEWORTH Re. 19,554
FABRIC AND METHOD AND APPARATUS FOR PRODUCING IT
Original Filed Feb. 10, 1932 3 Sheets-Sheet 2
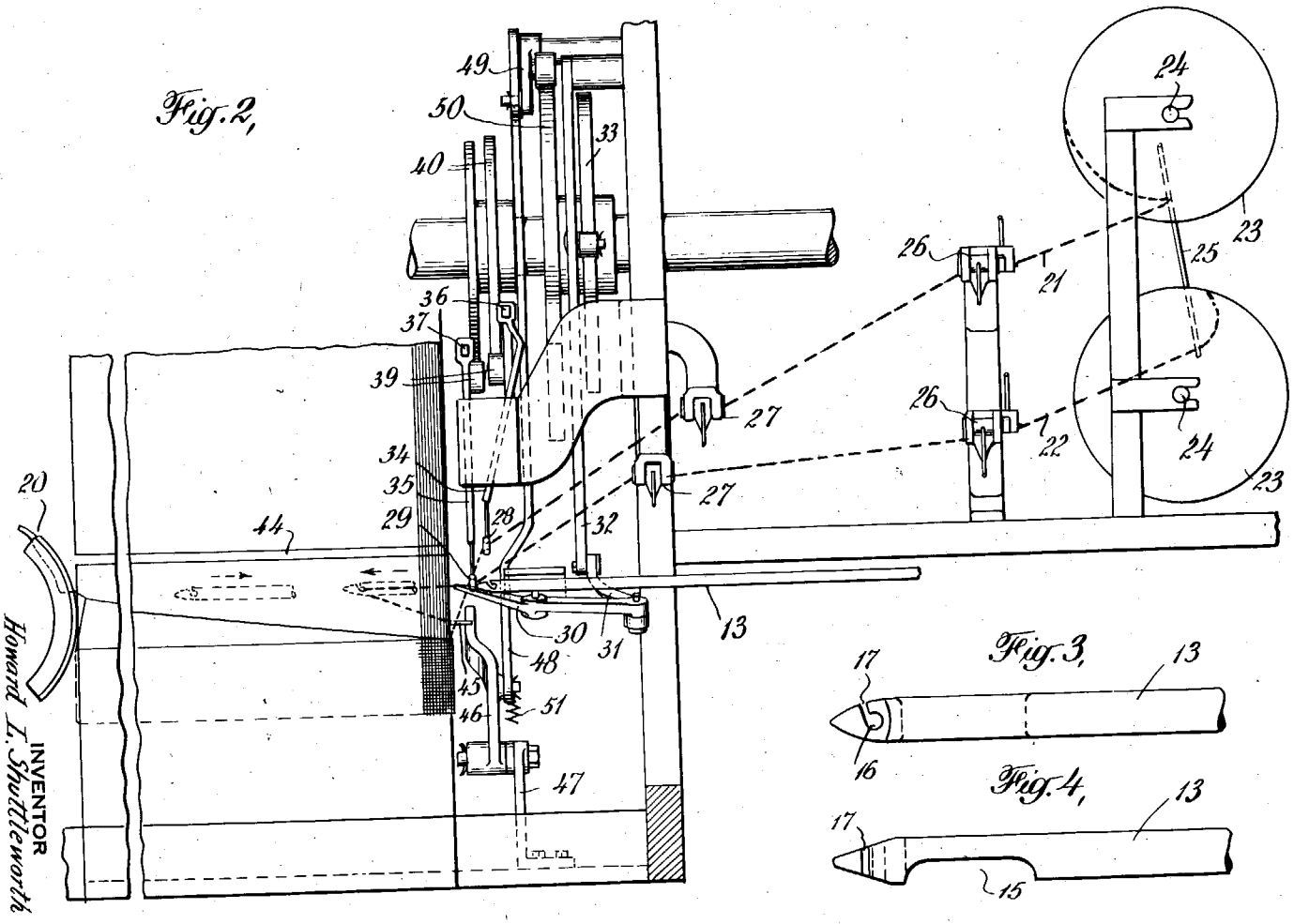
INVENTOR
Howard L. Shuttleworth
BY
Pennie, Davis, Marvin & Edmonds
ATTORNEYS April 30, 1935. H. L. SHUTTLEWORTH Re. 19,554
FABRIC AND METHOD AND APPARATUS FOR PRODUCING IT
Original Filed Feb. 10, 1932 3 Sheets-Sheet 3
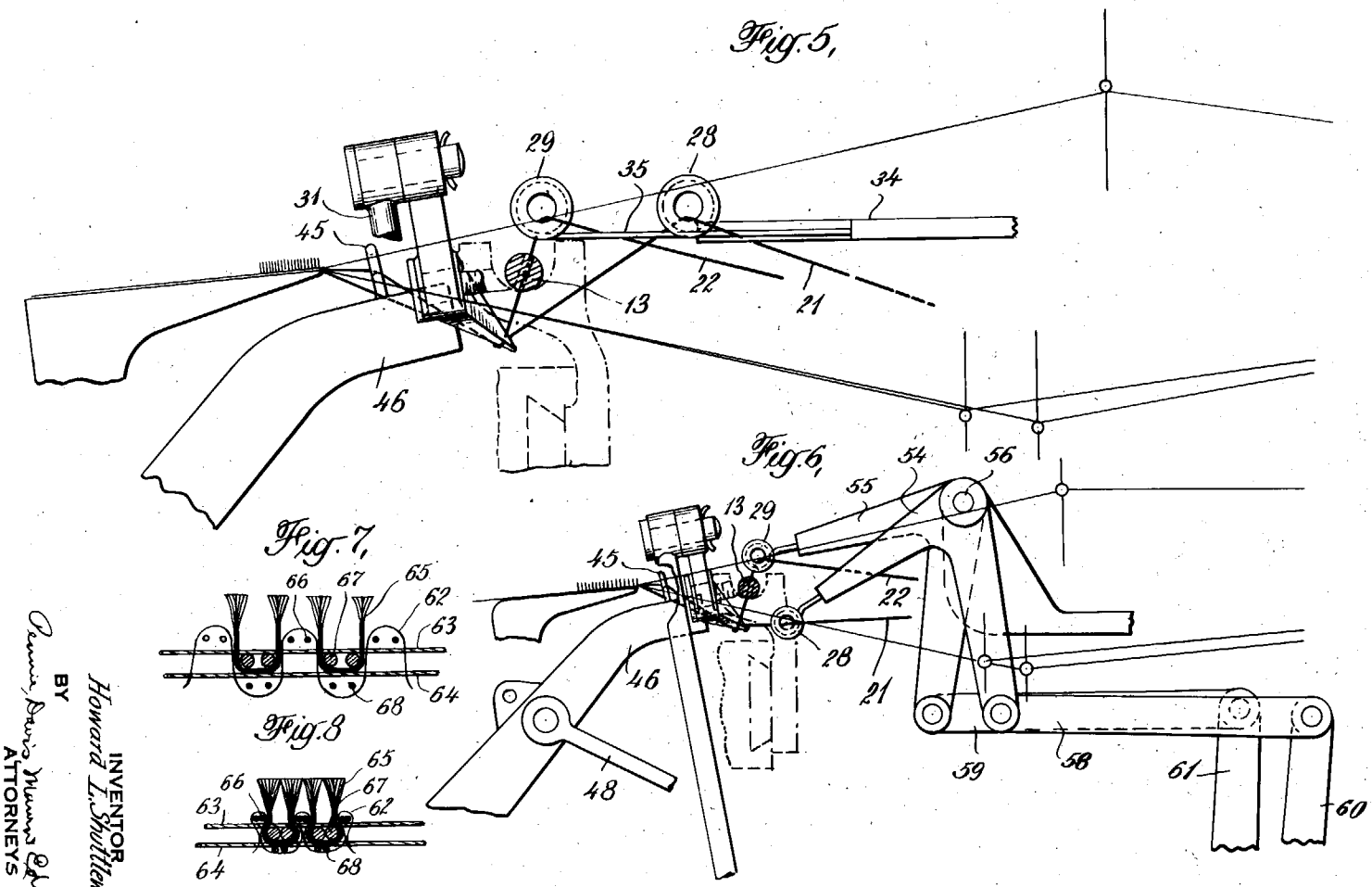
INVENTOR
Howard L. Shuttleworth
BY
Pennie, Davis, Marvin & Edmonds
ATTORNEYS Reissued Apr. 30, 1935

Re. 19,554

UNITED STATES PATENT OFFICE 19,554

FABRIC AND METHOD AND APPARATUS FOR PRODUCING IT

Howard L. Shuttleworth, Amsterdam, N. Y., assignor to Mohawk Carpet Mills, Inc., Amsterdam, N. Y., a corporation of New York Original No. 1,939,864, dated December 19, 1933, Serial No. 591,992, February 10, 1932. Application for reissue August 28, 1934, Serial No. 741,820

11 Claims. (Cl. 139—124)

This invention relates to the art of weaving and is concerned more particularly with a novel pile fabric and a method and apparatus for making it, the new fabric being distinguished from prior fabrics of the same general type in that it may be woven so as to have varying characteristics, selected in accordance with the purpose for which it is to be used. The fabric of the invention is of the type which includes a plurality of shots of filling for each transverse row of pile tufts and, in producing the fabric by the new method and apparatus, fillings of different kinds or weights are selectively incorporated in different places in the fabric to achieve the desired result.

The pile fabrics of the invention are of the type which are woven on looms, in which the weft is inserted by means of a needle, for example, Axminster looms, and for purposes of explanation, the weaving of an Axminster fabric embodying the principles of the invention and a loom for producing such fabric will presently be described in detail, although it is to be understood that the utility of the invention is not limited to that particular fabric.

In weaving fabrics on needle looms, it is now customary practice to use the same kind of weft yarn throughout the production of the fabric, because the needle employed has an eye through which the weft yarn is threaded and changing of the yarn is impossible except by stopping the loom and rethreading the needle. In fabrics in which there are two or more shots of filling for each transverse row of pile tufts, the appearance, life, and various other qualities of the fabric can be improved, for example, by employing weft yarns of one type for holding the pile tufts in place and weft yarns of another in the back of the fabric, but the impossibility in present looms of changing from one weft yarn to another without interruption to the operation of the loom has made it impractical to produce such fabrics and, as a consequence, weft yarns are employed which are fairly satisfactory for both purposes but are not the best that could be employed for either purpose.

The present invention is directed to the provision of a novel fabric in which the filling yarns are of different kinds selected with reference to their position in the fabric and the qualities that the fabric is to have, the invention also including a method and apparatus by which the fabric may be cheaply and rapidly produced. In weaving the new fabric in accordance with this method, the filling yarns are inserted in the fabric by means of a needle of novel construction and the needle engages the yarn and carries the latter with it during its advancing movement only, the needle retaining control of the yarn until after the selvage cord has been interlocked with the yarn and then releasing the yarn at the beginning of its retractile movement. The needle is thus rethreaded for each advancing movement and the threading operation is carried on under the selective control so that any one of a plurality of weft yarns may be supplied for insertion in the fabric as may be desired.

The loom employed in producing the new fabric includes the usual weaving mechanism, a needle of novel construction, and means for supplying weft yarn to the needle from a plurality of supplies in a predetermined order. The needle is generally of standard construction but has an eye to which access may be had through the side of the needle, and guide means are provided for the yarns from the several supplies, the guide means being operated so that in each advancing movement of the needle one of the yarns is positioned so that it is automatically placed in the eye as the needle advances, while the other yarns are kept from contact with the needle. The mechanism employed in the selective threading operation includes both individual guide means for the yarns, movable into and out of supplying position, and other devices which insure that the selected yarn will be picked up by the needle and properly incorporated in the fabric while the other yarns are maintained out of engagement by the needle.

For a better understanding of the invention, reference may be had to the accompanying drawings illustrating a loom of the Axminster type on which the fabric of the invention may be woven in accordance with the novel method, the loom illustrated being arranged for the weaving of a fabric in which three shots of filling are inserted for each row of pile tufts across the fabric.

In the drawings, Fig. 1 is a view of the loom in side elevation, certain parts being omitted and others shown in section;

Fig. 2 is a plan view of a portion of the loom shown in Fig. 1 with some parts omitted and others shown in section;

Fig. 3 is a plan view of a portion of the needle used in the loom;

Fig. 4 is a view of the needle in side elevation;

Fig. 5 is a view of a part of the mechanism illustrated in Fig. 1 shown on an enlarged scale;

Fig. 6 is a view similar to Fig. 5 but showing a modified construction;

Fig. 7 is a view in longitudinal section of a portion of the new fabric, the threads being spaced apart to illustrate the construction more clearly, and Fig. 8 is a view similar to Fig. 7 with the threads beaten up.

The loom illustrated in the drawings is generally of the ordinary Axminster type but has been provided with additional devices for the production of the new fabric. The loom includes the usual frame 10 and heddle mechanism 11 of standard construction for the purpose of manipulating the warp threads to form a shed 12 through which weft yarn is inserted by means of the needle 13. The needle is mounted in the usual guideway and reciprocated by any suitable mechanism for the purpose.

The needle in the new loom is formed with a recess 15 on its under side shortly to the rear of its advancing end and it is provided with a vertical eye 16 to which access may be had through the side of the needle for example, by means of a slot 17. This slot is inclined in a forward direction to insure that weft yarn contacting with the point of the needle will enter the eye as the needle advances and the yarn in the eye will be released from the needle in the retractile movement of the latter.

In the path of the needle and at the side of the shed opposite from the needle operating mechanism is a selvage shuttle 20 moving in the usual raceway and operated in timed relation to the movement of the needle so that when the needle passes through the shed and lies with its recess in registry with the shuttle, the latter may pass through the recess and through the loop of weft yarn carried by the needle to interlock the selvage chord with the shot, the chord thus holding the loop so that when the needle is retracted, the yarn will be removed from its eye.

In each forward movement of the needle, a weft yarn is supplied to the needle for insertion in the fabric and the supplying of the weft yarn is selectively controlled in accordance with the position in which the yarn is to be inserted in the fabric and the qualities that the fabric is to have. In the construction illustrated, two weft yarns 21 and 22 are supplied to the needle but additional yarns may be employed in the fabric if desired. The weft yarns are drawn from supplies 23 mounted on spindles 24 supported in any suitable way, as, for example, in brackets 24 mounted on the loom frame, and each yarn passes from its supply beneath a tension bar 25, through a tensioning device 26, and through a stop motion device 27, the tensioning and stop motion devices being of standard construction and mounted on the loom in any convenient manner. From the stop motion devices, the yarns pass through two guide eyes 28 and 29, respectively, and then to the fabric.

Upon each forward movement of the needle, a selected weft yarn is moved into a position in which it engages the side of the needle so that as the latter advances, the yarn will move through the slot 17 and into the eye 16, this weft yarn being then carried through the shed by the needle in the ordinary way. The insertion of the selected yarn in the eye of the needle is accomplished in part by movement of the guide eye for that yarn to a position toward the needle and in the drawings, guide eye 29 for the yarn 22 is illustrated as advanced so that yarn 22 may be picked up by the needle, while guide eye 28 for yarn 21 is in retracted position. The forward movement of the guide eye may in itself not be sufficient to insure that the yarn will be picked up by the needle, and to insure completion of the operation there is provided a movable member which engages the yarns and insures that the selected yarn will enter the eye in the needle while the other yarns remain out of contact with the needle. In the construction illustrated, the movable member takes the form of a placement finger 30 forming one arm of a lever pivoted at a convenient point on the frame, the finger being so disposed as to lie above the yarns between their guide eyes and the edge of the fabric. The lever is operated by means of a link 31 connected to a lever 32 pivoted on any convenient fixed part of the loom and providing with a roller 32′ which bears against the edge of a cam 33 mounted on the cam shaft of the loom. The cam is so timed as to press the finger down upon the weft yarns just before the needle begins to advance and the pressure of the finger on the yarns causes the yarn passing through the eye which is in forward position to bear against the side of the needle when the latter advances, while the yarns from eyes which are in retracted position lie below and away from the side of the needle. In the drawings (Figs. 1 and 5), it will be observed that the finger has caused the yarn 22 to occupy a position in which it contacts with the point of the needle as the latter advances and automatically enters the eye 16 through slot 17, while yarn 21 is kept clear of the needle.

The finger operates for each movement of the needle, releasing the yarns just after one of them has been picked up by the needle, and remaining out of action until the needle has moved back out of the shed and is ready to advance for the next shot.

The guide eyes 28 and 29 which are movable selectively to cause the yarns to be supplied to the needle in the proper sequence are mounted on rods 34 and 35, respectively, which are operated by levers 36 and 37 pivoted at one end on the frame 38 and carrying cam rollers 39 which cooperate with cams 40 on the cam shaft of the loom. The levers are held with their rollers in contact with the faces of their cams by springs 41 attached to the levers at one end and at the other to any fixed part of the loom, such as block 42.

The loom is provided with the usual reed or lay, conventionally illustrated at 44, which beats up the weft shot after its insertion, and the loom is also provided with the usual selvage point 45 which engages the shot after it has been beaten up and holds it in beaten up position, the point remaining in contact with the shot until after the next shot has been inserted. The selvage point 45 is carried by a lever 46 pivoted upon a bracket 47 upon the frame and actuated by a link 48 connected to a lever 49 having a roller 49′ contacting with a cam 50 on the loom cam shaft, the lever 46 being acted on by a spring 51 which tends to maintain the selvage point in raised position.

With the construction described, the insertion of the weft yarn is controlled selectively by the mechanism which causes the guide eyes 28 and 29 to move in and out of their position adjacent the needle, and the order in which the guide eyes advance is determined by the shape of the cams 46. In the loom shown, two different kinds of weft yarns are inserted in the fabric and these weft yarns may be inserted in any order desired by the use of properly formed cams. In some fabrics, it may be desirable to use more than two kinds of weft yarns, in which event, additional guide eyes will be employed with their operating devices, but in any fabric woven on the new loom, the weft yarns may be inserted in any sequence desired so that the yarns will occupy any desired position in the fabric.

The weft yarns which are not to be picked up by the needle and inserted in the fabric are held out of contact with the needle by the placement finger while the needle is being threaded, but as soon as the threading action has occurred, the finger rises and thereafter the yarns not being inserted may bear against the under side of the needle. Ordinarily, this is not objectionable but if the needle is dirty or light weight yarns are being used, the contact of the yarns with the surface of the needle may either dirty the yarns or cause them to become frayed. To overcome any difficulty of this kind, the modified construction illustrated in Fig. 6 may be used.

In the modified form of apparatus, the guide eyes 28 and 29 are mounted in the ends of bell crank levers 54 and 55, respectively, these levers being pivoted at 56. The other arm of each bell crank is connected by a link 58 or 59 to levers 60 or 61, these levers corresponding in function to levers 36 and 37 and being actuated by cams in a similar manner. With the modified construction, the guide eye for the yarn which to be picked up by the needle is raised to the position occupied by the guide eye 29 in Fig. 6, and when the placement finger 30 moves down, this yarn is forced into contact with the side of the needle through which the slot 17 opens. The guide eyes for the other yarn remain in the lower position occupied by the guide eye 28 (Fig. 6) and the yarns not to be selected are thus kept out of contact with the needle by their guide eyes, after the placement finger has been moved out of contact therewith.

In Figs. 7 and 8, there is illustrated an example of a fabric constructed in accordance with this invention. The fabric shown is of the Axminster type with three shots of weft for each row of pile tufts. The fabric includes binder warps 62, stuffer warps 63, 64, and pile tufts 65. The shots of weft yarn are arranged in three series, the shots 66 of the upper series being held in place by the binder warps 62 on top of stuffer warps 63, the shots 67 of the middle series lying between the stuffer warps and having the pile yarns looped about them, and the shots 68 of the lower series lying below the stuffer warps and being held in place by binder warps 62. In this fabric, the weft yarns used in the top and bottom shots 66 and 68, respectively, are of light weight, while the yarn used for the middle shots and on which the pile tufts are looped are heavier and coarser. When the yarns in such a fabric are beaten up, as illustrated in Fig. 8, the weft shots of the top series lie in close contact with the pile tufts and the tufts are thus held firmly in place, and the use of weft yarns of large size for the shots about which the tufts are looped assists in holding the tufts in position. The yarns used in the shots of the top and bottom series are small, hard, and tightly twisted while the yarns about which the pile tufts are looped are soft, coarse and heavy. With this arrangement, the fabric is tighter, beats up more closely, and has better wearing qualities than those in which the weft yarns are all of the same type. Also, the new fabric has a more uniform surface than those woven in accordance with prior methods and a superior face yarn coverage is obtained.

I claim:—

1. In a loom for weaving fabrics, a needle for inserting weft shots having an opening from the eye to the side of the needle, means for selectively inserting any of a plurality of yarns through said opening comprising individual guiding means for the individual yarns, each guiding means being movable from a position in which it holds its yarn away from the needle to another position in which a portion of said yarn lies closer to the path of the needle, a movable finger engageable with the selected yarn, said guiding means and finger engaging the yarn on opposite sides of the needle, and means for actuating said guiding means selectively and for moving said finger to cause it to cooperate with the selected guiding means in the presentation of a yarn to the needle.

2. In a loom for weaving fabrics, a needle for inserting weft shots having a slot opening from the eye to the outside of the needle, means for selectively inserting any of a plurality of yarns through said slot comprising guides for said individual yarns, means for moving said guides selectively to advance the selected yarn toward the needle, a finger for engaging the selected yarn, said guides and finger engaging the yarns on opposite sides of the needle, means for moving the finger to cause it to cooperate with a guide in the inserting operation, and a selvedge point for engaging each inserted yarn near the selvedge of the fabric to hold said yarn in position.

3. In a pile fabric loom, the combination of a needle for inserting weft shots, said needle having an eye opening at the side of the needle for sidewise insertion of a yarn in said eye, a plurality of supplies of weft yarn, a plurality of movable guides, one for each of said yarns, means for moving said guides selectively into and out of position to cause them to move their yarns toward the needle, a finger cooperating with the guides, means for moving the finger to cause it to engage the yarn moved by one of said guides and position said yarn for introduction into the eye of the needle as the latter advances, and a selvedge point for engaging each inserted yarn near the selvedge of the fabric to hold said yarn in position.

4. In a pile fabric loom, the combination of a needle for inserting weft shots, said needle having an eye opening at the side of the needle for sidewise insertion of a yarn in said eye, a plurality of supplies of weft yarn, a plurality of movable guides, one for each of said yarns, means for moving said guides selectively into and out of position to cause them to move their yarns toward the needle, a finger cooperating with the guides, means for moving the finger to cause it to engage the yarn moved by one of said guides and position said yarn for introduction into the eye of the needle as the latter advances, a selvedge point for engaging each inserted shot near the selvedge of the fabric to hold said shot in position, and a selvedge shuttle for inserting a selvedge chord through each inserted shot.

5. In a loom, the combination of a needle having an aperture in which a weft thread may be received so that it will be carried through the shed with the needle, a pair of guides for individual weft threads, each thread extending from its guide to the selvedge of the fabric at its last point of insertion, means for moving said guides to cause one of them to position its thread adjacent the path of travel of the needle while the other holds its thread remote therefrom, a member movable into engagement with said positioned thread, at a point between the selvedge of the fabric and the path of travel of the needle and forcing said thread out of its normal position and maintaining the portion of it between the member and the guide for said thread in the path of travel of said needle and means for actuating said member to cause it to cooperate with said operative guide in the presentation of said positioned thread to the needle.

6. In a loom, the combination of a needle having an aperture in which a weft thread may be received so that it will be carried through the shed with the needle, a pair of guides for individual weft threads, each thread extending from its guide to the selvedge of the fabric at its last point of insertion, means for moving said guides to cause one of them to position its thread adjacent the path of travel of the needle while the other holds its thread remote therefrom, a member movable into lateral engagement with said positioned thread, at a point between the selvedge of the fabric and the path of travel of the needle and forcing said thread out of its normal position and maintaining the portion of it between said member and the guide for said thread in the path of travel of said needle, said member contacting with said thread between its guide and the selvedge of the fabric, and means for actuating said member to cause it to bear against said thread and thereby cooperate with said operative guide in the presentation of said positioned thread to the needle.

7. In a loom, the combination of a needle having an aperture adjacent its free end for engaging a weft thread and carrying it through the shed with the needle, a plurality of guides for individual weft threads movable transverse to the path of travel of the needle, each thread extending from its guide to the selvedge of the fabric at its last point of insertion, means for moving said guides to cause a selected guide to position its thread adjacent said path, a member movable into lateral engagement with said positioned thread, at a point between the selvedge of the fabric and the path of travel of said needle to force said thread out of its normal position and maintain the portion of it between said member and the guide for said thread in the path of travel of the needle and means for actuating said member to cause it to bear against said thread and thereby cooperate with said selected guide in the presentation of said positioned thread to the needle.

8. In a loom, the combination of a needle having an aperture adjacent its free end for engaging a weft thread and carrying it through the shed with the needle, a plurality of movable weft thread guides, one for each thread, each thread extending from its guide to the selvedge of the fabric at its point of last insertion, means for moving said guides to cause a selected guide to position its thread for engagement by the needle, a pivotally mounted member movable into lateral engagement with said positioned thread, at a point between the selvedge of the fabric and the path of travel of said needle to force said thread out of its normal position and maintain the portion of it between said member and the guide for said thread in the path of travel of the needle and means for actuating said member to cause it to engage said positioned thread and cooperate with said selected guide in the presentation of said thread to the needle.

9. In a loom, the combination of a needle for inserting weft shots, said needle having an open recess in which a weft thread may be received so that it will be carried through the shed with the needle, and means for selectively presenting any one of a plurality of threads to said needle to enter said recess, said means comprising individual guides for the several threads, said guides acting on the threads at one side of the needle and each thread extending from its guide to the selvedge of the fabric at the point of last insertion of said thread, means for moving said guides selectively to cause one of them to present its thread to the needle, a member movable into lateral engagement with the presented thread at the other side of the needle and forcing said thread out of its normal position and maintaining the portion of it between said member and the guide for said thread in the path of travel of the needle, and means for actuating said member to cause it to engage the thread and thereby cooperate with said guides.

10. In a loom, the combination of a needle for inserting weft shots, said needles having an open recess in which a weft thread may be received to be carried through the shed with the needle, and means for selectively introducing any one of a plurality of threads into said recess, said means comprising a plurality of movable guides each controlling one of said threads and lying at one side of the path of travel of said needle, each thread extending from its guide to the selvedge of the fabric at the point of last insertion of said thread, means for moving said guides selectively to cause the guide for a selected thread to present its thread to the path of travel of said needle, a member movable into lateral engagement with the selected thread at the other side of the path of travel of the needle and operable upon engagement with said thread to force it out of its normal position and maintain the portion of it between said member and the guide for said thread in the path of travel of the needle, and means for actuating said member to cause it to engage and position the selected thread to permit it to be received in said recess in the needle as the latter advances.

11. In a loom, the combination of a needle for inserting weft shots, said needle having an open recess in which a weft thread may be received to be carried through the shed with the needle, and means for selectively introducing any one of a plurality of threads into said recess, said means comprising a plurality of movable guides at one side of the path of travel of the needle, each controlling one of said threads, each thread extending from its guide to the selvedge of the fabric at the point of last insertion of said thread, means for moving said guides to cause the guide for a selected thread to present its thread to the needle while the other guides hold their threads remote from said path, a member cooperating with the guides for the selected thread, and means for moving the member to cause it to engage the thread controlled by the selected guide at the other side of the path of travel of the needle and move said thread out of its normal position and maintain the portion of it between its guide and the point of engagement of said thread by the member in the path of travel of the needle, and a selvedge shuttle on the opposite side of the loom from that at which the needle enters the shed, said shuttle operating to introduce a selvedge chord through each inserted weft shot.

HOWARD L. SHUTTLEWORTH.